United States Patent [19]

Levy

[11] Patent Number: 5,987,450
[45] Date of Patent: Nov. 16, 1999

[54] SYSTEM AND METHOD FOR OBTAINING COMPLETE AND CORRECT ANSWERS FROM INCOMPLETE AND/OR INCORRECT DATABASES

[75] Inventor: Alon Yitzchak Levy, Berkeley Heights, N.J.

[73] Assignee: AT&T, New York, N.Y.

[21] Appl. No.: 08/911,015

[22] Filed: Aug. 14, 1997

Related U.S. Application Data

[60] Provisional application No. 60/024,296, Aug. 22, 1996.
[51] Int. Cl.$^6$ .................................................. G06F 17/30
[52] U.S. Cl. .................................. 707/3; 707/2; 707/100
[58] Field of Search .................................. 707/1, 3, 4, 5, 707/2, 100

[56] References Cited

U.S. PATENT DOCUMENTS

| | | | |
|---|---|---|---|
| 5,418,943 | 5/1995 | Borgida et al. | 707/4 |
| 5,535,385 | 7/1996 | Griffin et al. | 707/3 |
| 5,584,024 | 12/1996 | Schwartz | 707/4 |
| 5,590,322 | 12/1996 | Harding et al. | 707/4 |
| 5,600,831 | 2/1997 | Levy et al. | 707/2 |
| 5,628,012 | 5/1997 | Libkin | 707/102 |
| 5,655,116 | 8/1997 | Kirk et al. | 707/1 |
| 5,768,578 | 6/1998 | Kirk et al. | 707/100 |
| 5,897,632 | 4/1999 | Dar et al. | 707/2 |

OTHER PUBLICATIONS

Y. Sagiv and M. Yannakakis, "Equivalence Among Relational Expressions with the Union and Difference Operations," Proceedings of the Fourth International Conference on Very Large Data Bases, West Berlin, West Germany, Sep. 13–15, 1978, 1978 IEEE, USA, pp. 535–548.

A. Y. Levy, A. O. Mendelzon, Y. Sagiv and D. Srivastava, "Answering Queries Using Views," (Extended Abstract), Proceedings of the 14$^{th}$ ACM Sigact–Sigmod–Sigart Symposium on Principles of Database Systems, San Jose, CA, 1995, pp. 95–104.

Elkan, Charles. "Independence of Logic Database Queries and Updates." Proceedings of the 9$^{th}$ ACM Sigact–Sigmod–Sigart Symposium on Principles of Database Systems, pp. 154–160, 1990.

Levy, Alon Y. et al. Abstract of "Answering Queries Using Views." Proceedings of the 14$^{th}$ ACM Sigact–Sigmod–Sigart Symposium on Principles of Database Systems, San Jose, CA, 1995.

Levy, Alon Y. et al. "Queries Independent of Updates." Proceedings of the 19$^{th}$ VLDB Conference, Dublin, Ireland, pp. 171–181, 1993.

Motro, Amihai. "Integrity=Validity +Completeness." *ACM Transactions on Database Systems*, vol. 14, No. 4, pp. 480–502, Dec. 1989.

Etzioni, Oren et al. Tractable Closed World Reasoning with Updates. Proceedings of KR–94, pp. 178–189, 1994.

*Primary Examiner*—Thomas G. Black
*Assistant Examiner*—Charles L. Rones
*Attorney, Agent, or Firm*—Oliff & Berridge, PLC

[57] ABSTRACT

A system and method for obtaining complete and correct answers from incomplete and/or partially incorrect databases determine if the answer to a query will be complete by determining whether the answer to the query is independent of an insertion update to the database. If the answer to the query is independent of an insertion update, the system and the method determine that the answer to the query will be complete. In the case of databases that may be incorrect, the system and the method determine if the answer to a given query will be correct by determining if the answer to the query is independent of a deletion update to the database. If the answer to the query is independent of a deletion update, the system and the method determine that the answer to the query will be correct.

9 Claims, 5 Drawing Sheets

FIG. 3
PRIOR ART

Method "decide-completeness"
/* Q is a query over the relations $R_1,...,R_{ni}$
$\Gamma$ is a set of local completeness statements: $LC(R'_i, C_i)$) for i $1 \leq i \leq n$.
The procedure returns YES if and only if Q is answer-complete
with respect to $\Gamma$.*/

Let $D_1,...,D_n$ be new relation symbols.
Define the views $V_1,...,V_n$ as follows: ($\bar{X}_i$ are the arguments of $R_i$)
    $V(\bar{X}_i)$: $-D_i(\bar{X}_i)$ & $-C_i$
    $V(\bar{X}_i)$: $-R_i(\bar{X}_i)$.
Let $Q_1$ be the query in which every occurrence of $R_i$ is replaced by
$V_i$, for i, $1 \leq i \leq n$. return YES if and only if
Q is equivalent to $Q_1$

FIG. 4

Method "detect-independence"
/* Q is a union of conjunctive queries: $Q_1 V,...,VQ_{ni}$
  E is one of the relations mentioned in $Q_i$
  $C(X_1,...,X_m)$ is a conjunctive constraint on the arguments of E
  that uses only built-in atoms, each with one constant. */

For every occurrence $E(Y_1,...,Y_m)$ of the relation E in a conjunctive
    query $Q_i \in Q$ do:
  Let $\psi$ be the mapping $X_j \rightarrow Y_j$ for j, $1 \leq j \leq m$.
  Let $Q'_i$ be the conjunctive query in which $\psi(C)$ is added to the
    subgoals of $Q_i$
  if $Q'_i$ is satisfiable then return not independent.
return independent.
end.

SYSTEM AND METHOD FOR OBTAINING COMPLETE AND CORRECT ANSWERS FROM INCOMPLETE AND/OR INCORRECT DATABASES

CROSS-REFERENCE TO RELATED APPLICATION

This application is related to prior provisional application Ser. No. 60/024,296, filed on Aug. 22, 1996.

BACKGROUND OF THE INVENTION

1. Field of Invention

This invention relates to relational databases. More specifically, this invention is directed to a system and method for obtaining complete and correct answers from databases that are incomplete and/or partially incorrect.

2. Description of Related Art

A database is usually assumed to be complete and correct. For example, in a relational database it is assumed that the extension of every relation contains all the tuples that are required to be in the relation. However, there are situations in which database query interfaces attempt to access databases that are only partially complete (i.e. some tuples are missing) and/or contain partially incorrect information. For example, database query interfaces that provide access to multiple heterogeneous information databases often encounter incomplete databases. For instance, a database query interface may have access to a university repository that has a database of publications authored by some, but not all, of the faculty and students of that university. However, the same interface may have access to the database of the Library of Congress, which has all of the books published in the United States in the past few decades.

If a database is only partially complete, the database query interface should reconsider the meaning of an answer provided by the database to a given query. For queries that do not contain negation, the answers obtained from the database are guaranteed to be a subset of the answers that would have been obtained if the database were complete. However, the database query interface must still determine whether the answer is complete. In addition, when the database query interface issues a query that contains negation to the incomplete database, the resulting answer may not be correct.

As an illustrative example, consider a database query interface that has access to several online databases with information about movies. The relation schema contains the following relations:

Movie (TITLE, DIRECTOR, YEAR)
Show (TITLE, THEATER, HOUR)
Oscar (TITLE, YEAR)

The relation "Movie" contains tuples describing the title, director and year of production of movies. The relation "Show" describes the movies playing in New York City. Specifically, the relation Show contains tuples that describe the title of the movie, the theater in which the movie is playing and at what hour the movie plays. The relation "Oscar" contains a tuple for each movie that won an Oscar™ award, and a tuple for the year in which it won the award.

Assume that the relations Show and Oscar are known to be complete, and that the relation Movie is complete only from the year 1960 (i.e., it may be missing movies from earlier years). Further assume that the interface has issued the following query $Q_1$ that asks for the pair (movie, director) for movies currently playing in New York City:

($Q_1$): SELECT m.TITLE, m.DIRECTOR
FROM Movie m, Show s
WHERE m.TITLE=s.TITLE.

The answer to this query may be incomplete. Intuitively, the answer is incomplete because if some of the missing tuples are inserted into the relation Movie, the answer to the query may change. However, assume that the system issues the following query $Q_2$ that asks for directors whose movies have won Oscars™ since 1965:

($Q_2$) SELECT m. DIRECTOR
FROM Movie m, Oscar o
WHERE m.TITLE=o.TITLE AND
m.YEAR=o.YEAR AND
o.YEAR≧1965

The answer to this query is complete, even though the relation Movie is not complete. This is because only tuples of a movie whose third argument is 1965 or greater can be joined with tuples from the relation Oscar to yield an answer to the query. Therefore, if Movie is complete for that part of the relation, the answer to the query will be complete. Furthermore, because the answer to $Q_2$ is guaranteed to be complete, the answer to the following query is also guaranteed to be complete:

($Q_3$): SELECT m.DIRECTOR
FROM Movie m, Oscar o
WHERE m.TITLE=o.TITLE AND
NOT EXISTS (SELECT * FROM Movie m1, Oscar o1
WHERE m.DIRECTOR=m1.DIRECTOR AND
m1.TITLE=o1.TITLE AND
o1.YEAR≧1965) The query $Q_3$ asks for directors who have won Oscars™ but who have not won any additional Oscars™ since 1965.

An approach for determining answer-correctness and answer-completeness in the presence of incorrect or incomplete databases is described in Motro et al., "Integrity= Validity+Completeness," ACM Transactions on Database Systems, Vol. 14, No. 4, December 1989, pages 480–502. This approach is based on describing the complete or valid parts of the database as "views." Given a query Q, if the query can be rewritten using the complete or valid views, then the answer is complete. Mctro describes a method that finds "rewritings" of the queries using the views. However, the method is not guaranteed to find a rewriting if one exists.

A complete method for finding rewritings of queries using views is described in Levy et al., "Answering Queries Using Views," Proceedings of the 14$^{th}$ ACM SIGACT-SIGMOD-SIGART Symposium on Principles of Database Systems, San Jose, Calif., 1995 (Levy 1). However, finding a rewriting of the query using views has not been shown to be a necessary condition foc answer-completeness. In addition, the method described in Motro does not address the problem of determining answer-completeness with respect to a specific database instance (i.e., whether the answer to the query is complete given the current state of the database).

Another method for determining answer-completeness is described in Etzioni et al., "Tractable Closed World Reasoning With Updates," Proceedings of KR-94, 1994. Etzioni determined that answer-completeness is closed under conjunction and partial instantiation of queries, and used these determinations as the basis for the method. However, the method disclosed in Etzioni is not guaranteed to always detect answer-completeness. In addition, the method only allows a very restricted class of local completeness statements. In particular, the method disclosed in Etzioni does not allow local completeness statements that contain existential variables, or that contain interpreted predicates.

Yet another method for determining answer-completeness is disclosed in Elkan, "Independence of Logic Database Queries and Updates," Proceedings of the $9^{th}$ ACM Symposium on Principles of Database Systems, 1990, pages 154–160. However, this method applies only to queries with no self-joins (i.e., at most one occurrence of every relation in the query).

SUMMARY OF THE INVENTION

This invention thus provides a system and a method for obtaining complete and correct answers from incomplete and/or partially incorrect databases. Unlike prior methods, the system and the method of this invention always detects when an answer to a query will be complete and correct. In addition, the system and the method of this invention is applicable to cases in which the updated tuples are described using constraints with built-in order predicates ($\leq$, <, =, and $\neq$).

The system and method of this invention determine if the answer to a query will be complete by determining whether the answer to the query is independent of an insertion update to the database. If the answer to the query is independent of an insertion update, the system and the method determine that the answer to the query will be complete. In the case of databases that may be incorrect, the system and the method determine if the answer to a given query will be correct by determining if the answer to the query is independent of a deletion update to the database. If the answer to the query is independent of a deletion update, the system and the method determine that the answer to the query will be correct.

In a preferred embodiment of the method, detecting whether the answer to a query is independent of an insertion or deletion update is accomplished by determining whether the updated tuples and the query are mutually unsatisfiable. The preferred method is applicable to systems which utilize variable-integral queries and updates, in which the updated tuples are specified by a conjunction of built-in atoms, where each atom contains one constant. In addition, the preferred method can be implemented in polynomial time.

If the method determines that the answer to the query will be complete, the answer to the query will be complete regardless of the specific database state, as long as the database satisfies known "local-completeness" constraints. However, if the method determines that the answer to the query will not be complete, there may still be certain database states in which the answer to the query will be complete. In another preferred embodiment, the method determines whether the answer to the query will be complete given the current database state.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 3 is a prior art method for determining the completeness of a query-answer;

FIG. 4 is a method for determining the independence of variable-integral query answers from variable-integral database updates according to this invention;

DETAILED DESCRIPTION OF PREFERRED EMBODIMENTS

Figure 1:
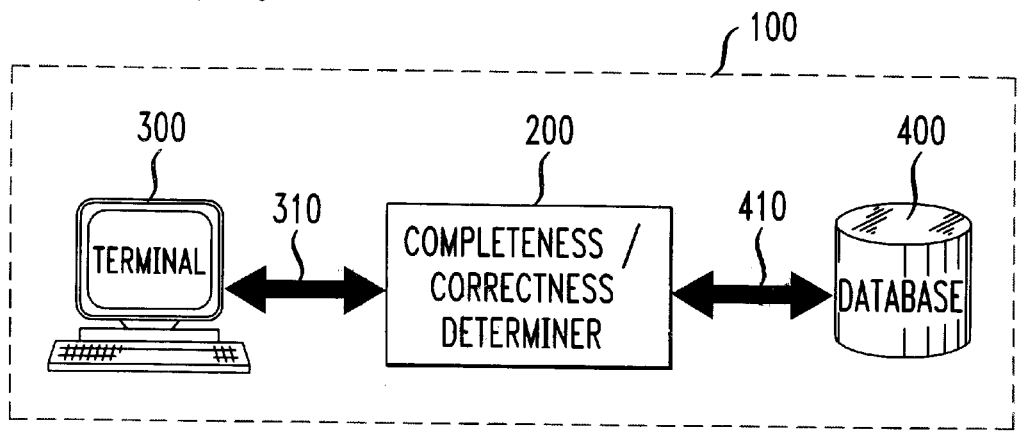
FIG. 1 is a block diagram of an information retrieval system incorporating the completeness/correctness determiner of this invention.

FIG. 1 illustrates an information retrieval system 100 incorporating the completeness/correctness determiner 200 of this invention. The system 100 also includes a terminal 300 and a database 400.

A user (not shown) uses the terminal 300 to input a query. The query is sent to the completeness/correctness determiner 200 over a bus 310. The completeness/correctness determiner 200 sends the query to database 400 over a bus 410. The database 400 sends the answer to the query back to the completeness/correctness determiner 200 over the bus 410. The completeness/correctness determiner 200 determines the completeness and correctness of the query answer, and sends the query answer and the completeness/correctness information to terminal 300 over the bus 310.

Figure 2:
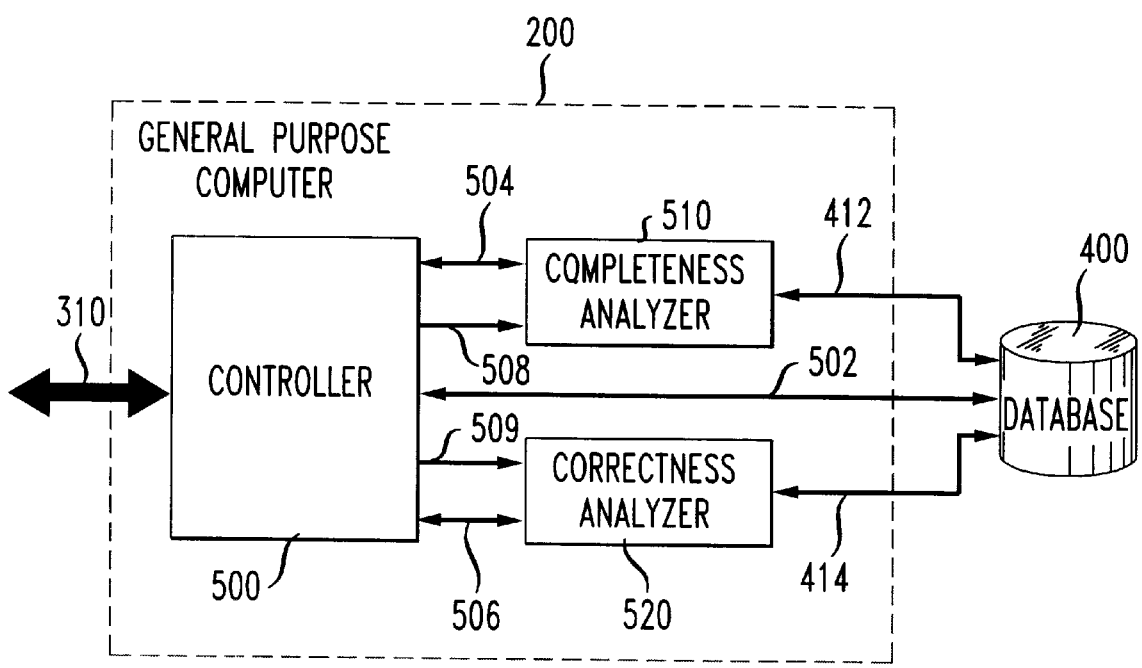
FIG. 2 is a block diagram of a preferred embodiment of the completeness/correctness determiner of this invention.

FIG. 2 illustrates a preferred embodiment of the completeness/correctness determiner 200 of this invention. The completeness/correctness determiner 200 includes a controller 500, a completeness analyzer 510 and a correctness analyzer 520.

A query is input to the controller 500 over the bus 310. The controller 500 sends the query to the database 400 and receives the answer to the query from database 400 over a signal line 502. The controller 500 also sends the query to the completeness analyzer 510 and the correctness analyzer 520 over the signal lines 504 and 506, respectively. The controller outputs control signals over the signal lines 508 and 509 to the completeness analyzer 510 and the correctness analyzer 520, respectively. The completeness analyzer 510 sends test queries to the database 400, and receives the answers to the test queries from the database 400 over the signal line 412. The correctness analyzer 520 sends test queries to the database 400, and receives the answers to the test queries from the database 400 over the signal line 414.

In operation, the controller 500 receives a query from the terminal 300, outputs the query to the database 400 and receives the answer to the query from the database 400. Although a single database 400 is shown for illustration purposes, it should be appreciated that the completeness/correctness determiner 200 of this invention is applicable to information retrieval systems 100 that provide access to multiple databases.

The controller 500 also sends the query to the completeness analyzer 510 and the correctness analyzer 520. The completeness analyzer 510 and correctness analyzer 520 determine whether the query answer will be complete and correct, respectively. The operation of the completeness analyzer 510 and the correctness analyzer 520 will be explained in more detail below.

The completeness analyzer 510 and correctness analyzer 520 send a completeness determination and a correctness determination, respectively, to the controller 500. The controller 500 sends the query answer, as well as the completeness and correctness determinations, to the terminal 300.

In describing the operation of the completeness/correctness determiner 200, it is assumed that the query is one that involves "select," "project," "join" or "union," and that may contain one or more of the built-in comparison predicates "$\leq$," "$<$," "$=$," and "$\neq$." Furthermore, it is assumed that the relations and queries are sets (i.e., not multisets). In addition, the notation of conjunctive queries, described in Jeffrey D. Ullman, *Principles of Databases and Knowledge-Base Systems*, Vols. I and II, Computer Science Press, Rockville, Md., 1989, will be used to describe the operation of the completeness/correctness determiner 200.

As an illustrative example of conjunctive query notation, the query:

(Q$_2$) SELECT m.DIRECTOR
FROM Movie m, Oscar o
WHERE m.TITLE=o.TITLE AND
o.YEAR>1965 is written as a rule of the form:

$$Q_2(\text{Director}): -\text{Movie}(\text{Title},\text{Director},\text{Year})\&\text{Oscar}(\text{Title},\text{Year}_1)\&\text{Year}_1 \geq 1965. \quad (1)$$

Q$_2$ (Director) is the head of the query, and its argument "Director" is its distinguished variable. The distinguished variables of the query correspond to attributes appearing in the SELECT clause. "Movie (Title, Director, Year)" and "Oscar (Title, Year$_1$)" are the atoms in the body of the query. The equality predicates in the WHERE clause are represented by equating variables in different atoms of a conjunctive query. The atom "Year$_1 \geq 1965$" is an atom of a built-in predicate (i.e., "$\geq$" in the above example). A query that is a union over select-project-join queries is represented by a set of conjunctive queries, with the head of each conjunctive query having the same arity.

For a database D and a query Q, the result of evaluating Q over D is denoted by Q(D). A query Q is satisfiable if there is a database D in which Q(D) is a non-empty set of tuples. Two queries Q$_1$ and Q$_2$ are equivalent if, for any database D, Q$_1$ (D)=Q$_2$ (D). A query Q is minimal if no union of conjunctive queries Q' exist in which the longest conjunctive query in Q' is shorter than one of the conjunctive queries in Q. The "length" of a conjunctive query refers to the number of non-built-in atoms it has.

The database 400 is partially complete when the tuples in each relation are only a subset of the tuples that should be in the relation. For illustration, a partially complete database is modeled as two databases, a real database and a virtual database. The virtual database contains the relations R$_1$, ..., R$_n$, and the real database contains the relations R'$_1$, ..., R'$_n$. For every i$\in$\{1 ... n\}, the relation R'$_i$ contains a subset of the tuples in R$_i$. The information retrieval system 100 only has access to the real database 400 and not to the virtual database. Therefore, a query Q is evaluated over the relations in the real database 400.

The completeness analyzer 510 determines whether the answer received from the database 400 for a query Q is complete (i.e., whether the database 400 provides all of the answers that would have been provided from the virtual database). If all that is known, with regards to the state of the database 400, is that R'$_i \subset$ R$_i$ for every i$\in$\{1 ... n\}, then whenever the query Q is satisfiable, the answer to Q may be incomplete. However, in most cases it is known that R'$_i$ is partially complete (i.e., some parts of R'$_i$ are identical to R$_i$).

In the illustrative example described above, it is assumed that the database 400 contains information about movies, with a relation schema that contains the relations:

Movie(Title,Director,Year)
Show(Title,Theater,Hour)
Oscar(Title,Year).

It may be known that the relation Movie is complete for tuples in which Year$\geq$1965. As another example, it may be known that the relation Movie is complete for titles of movies being shown in New York. Formally, the local-completeness of a relation R' in the real database 400 is specified by a constraint on the tuples of R that are guaranteed to be in R'.

The arguments of the relation R are defined as X$_1$, ... X$_n$. A constraint C is a conjunction of atoms that include variables from X$_1$, ..., X$_n$, as well as other variables and constants. The relations used in the constraint C can be either database relations (except for R) or built-in predicates. The tuples that do not satisfy C are denoted by the symbol $\neg$C.

Letting C be a constraint on the arguments of the relation R, any given database D satisfies the local-completeness statement LC(R'(RC)) if R' contains all the tuples of R that satisfy the constraint C, i.e., the results of the following two queries are identical over D:

$$Q_1(X_1, \ldots, X_n): -R(X_1, \ldots, X_n)\&C, \quad (2)$$

$$Q_2(X_1, \ldots, X_n): -R'(X_1, \ldots, X_n)\&C. \quad (3)$$

For example, the completeness condition that the relation Movie' contains all movies after 1965 is represented by the local completeness statement:

$$LC(\text{Movie'},(\text{Movie},\text{Year}\geq 1965)). \quad (4)$$

Also, the completeness condition that the relation Movie' has all the movies that are currently playing in New York is represented by the local-completeness statement:

$$LC(\text{Movie'},(\text{Movie},\text{Show}(\text{Title},\text{Theater},\text{Hour})). \quad (5)$$

Further, the completeness condition that the relation Movie' is complete with respect to movies that are playing in at least two theaters in New York is represented by the local completeness statement:

$$LC(\text{Movie'}, (\text{Movie},\text{Show}(\text{Title},\text{Theater1},\text{Hour1})\&\text{Show}(\text{Title},\text{Theater2},\text{Hour2})\&\text{Theater1}\neq\text{Theater2})). \quad (6)$$

The completeness of a database answer (i.e., "answer-completeness") will now be formally defined. Answer-completeness has two variants. In the first variant, one considers whether the query answer will be complete with respect to any database that satisfies the local-completeness statements. In the second variant, one considers whether the query answer will be complete with respect to only a single database instance. The first variant will be referred to as "answer-completeness," while the second variant will be referred to as "instance answer-completeness."

For purposes of analysis, $\Gamma$ is defined as a set of local-completeness statements about the relations $\bar{R}$=R$_1$, ..., R$_n$ (for the real database D) and their corresponding relations $\bar{R'}$=R'$_1$, ..., R'$_n$ (for the corresponding virtual database D'). In addition, Q is a query over the relations R, and Q' is a query that results from replacing every occurrence of R$_i$ by R'$_i$ in query Q, for $1 \leq i \leq n$. For any pair of database instances D and D', in which D and D' satisfy $\Gamma$, the query Q is answer-complete with respect to $\Gamma$ if Q(D)=Q' (D'). For a database instance D of $\bar{R}$, in which D and D' satisfy $\Gamma$, the query Q is instance answer-complete with respect to $\Gamma$ and the database instance D' of $\bar{R'}$ if Q(D)=Q'(D').

As an illustrative example, consider the following two sets $\Gamma_1$ and $\Gamma_2$ of local completeness statements:

$\Gamma_1$: LC(Movie',(Movie,Year≥1965)); (7)

$\Gamma_2$: LC(Movie',(Movie,Show(Title,Theater,Hour))). (8)

Query $Q_1$ asks for pairs (title, director) for movies playing in New York. Query $Q_2$ asks for directors whose movies have won Oscars™ since 1965. The answer to query $Q_1$ is incomplete with respect to $\Gamma_1$ because it may not contain pairs (title, director) for movies produced before 1965. However, for a database D', in which the relation Movie' contains all movies that are currently playing in New York, the answer to query $Q_1$ is complete with respect to database D'. Therefore, the answer to query $Q_1$ is complete with respect to $\Gamma_2$. The answer to query $Q_2$ is complete with respect to $\Gamma_1$, but not with respect to $\Gamma_2$.

The completeness analyzer 510 determines the completeness of a query answer by determining if the query answer is independent of an insertion update to the database 400. Methods for determining the independence of query answers from database updates are disclosed in Blakeley et al., "Updating Derived Relations: Detecting Irrelevant and Autonomously Computable Updates," Transactions of Database Systems, Vol. 14, No. 3, 1989, pages 369–400; and Levy et al., "Queries Independent of Updates," Proceedings of the 19$^{th}$ VLDB Conference, Dublin, Ireland, 1993, pages 171–181 (Levy 2).

Generally, the answer to a query Q is independent of updates to the database when the answer does not change as a result of an insertion to the database, or as a result of a deletion from the database. A possible update to the database is defined by specifying a relation R that is updated, and a constraint C that describes a set of tuples of the relation R that may be inserted to or deleted from the database.

The independence of a query answer from database updates will now be more formally defined. Let R be a relation, and C be a constraint on the arguments of relation R. An insertion update (R,C) is denoted by "In$^+$(Q, (R,C))", and a deletion update (R,C) is denoted by "In$^-$(Q, (R,C))". For any real database D, and for any virtual database R' that results from adding some tuples that satisfy C to the relation R of database D, the answer to query Q is independent of the insertion update "In (Q, (R, C) )" if Q (D)=Q (D'). Similarly, for any database D, and for any database D' that results from deleting some tuples that satisfy constraint C from relation R of database D, the answer query Q is independent of the deletion update "In$^-$Q, (R, C))" if Q (D)=Q (D')

As an illustrative example, consider the following query $Q_3$, which asks for the movies playing in New York that have received an Oscar™ in the past 20 years.

$Q_3$(Movie,Theater): –Show(Title,Theater,Hour)&Oscar(Title, Year)&Year≥1976. (9)

The answer to query $Q_3$ is independent of deleting tuples for which the year is less than 1970 from the relation Oscar. Another way of stating this is that "In$^-$($Q_3$, (Oscar, Year≤1970))" holds. However, the answer to query $Q_3$ is not independent of adding tuples for which the show time is after 8 pm to the relation Show. That is, "In$^+$($Q_3$, (Show, Hour≥8 pm))" does not hold.

As discussed above, the completeness analyzer 510 determines if the answer to a query will be complete by determining if the answer to the query is independent of an insertion update to the database 400. The connection between the independence of a query answer to an insertion update and the completeness of the query answer is illustrated with the following example. Assume that the local-completeness information available states that the relation Movie is complete for movies produced after 1965, i.e., the relation Movie may be missing tuples of movies produced before 1965. The answer to a query $Q_1$ that asks for the pairs (movie, director) for movies currently playing in New York will not be complete. The answer to query $Q_1$ will not be complete because the answer can change when tuples whose year is before 1965 is inserted into the relation Movie. That is, the answer to query $Q_1$ is not independent of inserting tuples whose year is before 1965 into the relation Movie.

However, the answer to query $Q_2$, which asks for directors whose movies have won Oscars™ since 1965, is guaranteed to be complete. This is because updating the database 400 with movies produced before 1965 will not change the answer to the query $Q_2$.

The connection between the completeness of a query answer and the query answer's independence from insertion updates to the database 400 is expressed in the following theorem:

Theorem 1

Let Q be a union of conjunctive queries, and let $\Gamma$ be a set of local completeness statements of the form LC(R'$_i$, (R$_i$, (R$_i$,C$_i$)) for i, $1 \leq i \leq n$. The answer to query Q is complete with respect to $\Gamma$ if and only if In$^+$(Q, (R$_i$, ¬C$_i$)) holds for every i, $1 \leq i \leq n$.

The proof of Theorem 1 will now be given. For one direction, assume In$^+$(Q, (R$_i$, ¬C$_i$)) holds for every i, $1 \leq i \leq n$, and let D and D' be two database instances of $\overline{R}$ and $\overline{R'}$, respectively, that satisfy $\Gamma$. One needs to show that Q(D)=Q'(D').

Let D$_i$ be a database in which the extension of R$_1$, . . . , R$_i$ is taken from database D, and the extension of R'$_{i+1}$, . . . R'$_n$ is taken from database D'. That is, D$_i$ is a database in which the virtual relations are taken for the first i relations, and the real relations are taken for the other relations Note that Q(D$_o$)=Q(D) and Q(D$_n$)=Q'(D'). It is proven by induction on i that Q(D$_i$)=Q(D$_{i-1}$). Therefore, Q(D)=Q'(D').

For that case in which i=1, the database D$_1$ is obtained from D$_o$ by adcing tuples that satisfy ¬C$_1$ to the extension of R$_1$. However, since In$^+$(Q, (R$_1$, ¬C$_1$)) holds for any database, it holds in particular for D$_o$, i.e., Q(D$_1$)=Q(D$_o$). The proof of the inductive step is similar.

For the other direction, assume that one of the independence assumptions does not hold. For example, assume "In$^+$(Q, (R$^1$, ¬C$_1$))" does not hold. For this case, there must be a database instance E of $\overline{R}$, and a set of tuples S of R$_1$ that satisfy ¬C, such that Q(R$_1$, . . . , R$_n$)≠Q(R$_1 \cup$S, R$_2$, . . . , R$_n$). Assume a database instance D' of $\overline{R'}$ that is identical to database instance E, and let D be the instance of $\overline{R}$ (that is also identical to E, except that R is replaced by (R$_1 \cup$S)). Note that $\Gamma$ is satisfied by the pair D and D'. However, Q(D)≠Q'(D'). Therefore, the answer to query Q is not complete with respect to $\Gamma$.

Theorem 1 has been used to develop methods for determining the completeness of a query answer. One method, disclosed in Levy 2, is illustrated in FIG. 3. The method of FIG. 3 determines the independence of a query answer from insertion or deletion updates by determining the equivalence between two queries.

The problem of determining query equivalence has been well studied in the art. Accordingly, the method of FIG. 3 can use a host of known methods to determine answer-completeness in various contexts. For example, a method for determining the equivalence of queries that contain unions and negations is disclosed in Sagiv et al., "Equivalence Among Relational Expressions With the Union and Indifference Operators," Journal of the ACM, Vol. 27, No. 4, 1981, pages 633–655.

Methods for determining the equivalence of queries when the database relations are known to satisfy integrity constraints (i.e., functional dependencies and tuple generating dependencies) are disclosed in Chandra et al., "Optimal Implementation of Conjunctive Queries in Relational Databases," Proceedings of the $9^{th}$ Annual ACM Symposium on Theory of Computing, 1977, pages 77–90; Aho et al., "Efficient Optimization of a Class of Relational Expressions," ACM Transactions on Database Systems, Vol. 4, No. 4, 1979, pages 435–454; Aho et al., "Equivalence of Relational Expressions," SIAM Journal of Computing, Vol. 8, No. 2, 1979, pages 218–246; and Johnson et al., "Testing Containment of Conjunctive Queries Under Functional and Inclusion Dependencies," Journal of Computer and System Sciences, Vol. 28, No. 1, 1983, pages 167–189.

Methods for determining the equivalence of queries in other restricted cases are disclosed in Chaudhuri et al., "On the Equivalence of Recursive and Nonrecursive Datalog Programs," The Proceedings of the $11^{th}$ ACM SIGACT-SIGMOD-SIGART Symposium on Principles of Database Systems, San Diego, Calif., 1992, pages 55–66; Chaudhuri et al., "On the Complexity of Equivalence Between Recursive and Nonrecursive Datalog Programs," The Proceedings of the $13^{th}$ ACM SIGACT-SIGMOD-SIGART Symposium on Principles of Database Systems, 1994, pages 55–66; Yehoshua Sagiv, "Optimizing Datalog Programs," *Foundations of Deductive Databases and Logic Programming*, Jack Minker, editor, Morgan Kaufmann, Los Altos, Calif., 1988, pages 659–698; and Levy 2.

Determining the completeness of a query answer is not possible in all cases. In particular, if Q is a union of conjunctive queries, and Γ is a set of local-completeness statements of the form $LC(R'_i, (R_i, C_i))$ for i, $1 \leq i \leq n$, the completeness of a query answer is only determinable if: (1) each of the $C_i$'s contains only arguments of $R_i$ (i.e., not existential arguments); or (2) the head of Q contains all the variables of the body of Q, and neither the $C_i$'s or Q use the predicates $\leq$, < or ≠.

When the constraints $C_i$ involve built-in predicates (i.e. "<," "$\leq$," and "≠" methods that determine the completeness of a query answer for case (1) above are implemented with algorithms that run in exponential time.

For cases involving variable-interval queries and variable-interval database updates, the present invention utilizes a method for detecting the independence of query answers from database updates that is more efficient than the prior art methods discussed above. In particular, a conjunctive query Q is a variable-interval query if all the built-in atoms in Q have one constant, i.e., there are no comparisons between pairs of variables. A variable-interval database update is an update -n which the updated tuples are specified by a conjunction of built-in atoms, where each atom contains one constant.

The preferred method for detecting independence for cases involving variable-interval queries and updates is based on determining if the updated tuples and the query are mutually unsatisfiable, rather than determining equivalence between the updated tuples and the query. An illustrative example is one in which a database contains the relation "inCar (Person,Car,Age)". A tuple (P,C,A) is in the relation inCar if the person P, whose age is A, is in car C. The view "carDrive(Person,Car,Age)" is defined as:

$$\text{carDrive}(P,C,A): \text{-inCar}(P,C,A), \text{driver}(P), \text{inCar}(P_1,C,A_1), \quad A_1 \geq 18. \tag{10}$$

That is, a person P is allowed to drive a car C if P has a driver's license and there is someone in the car above the age of 18.

A query to find all the adult drivers is:

$$\text{adultDriver}(P): \text{-carDrive}(P,C,A), \geq 18. \tag{11}$$

Assume that a deletion update removes from the relation inCar some tuples for which ¬Driver(P) and A<18. Such tuples cannot be part of a derivation of an answer to the query adultDriver because adultDriver uses only tuples of inCar, for which either P is a driver or the age is at least 18. In this case, the tuples involved in the database update are mutually unsatisfiable with the query adultDriver.

Consider a deletion update that removes from the relation inCar tuples that involve only non-drivers, i.e., tuples for which ¬Driver(P). Tuples of this set can be used in a derivation of the query adultDriver. For example, if the database contains the tuples inCar(Alice,C,19), driver (Alice) and inCar(Bob,C,20), the tuple "Bob" can be used to derive that Alice is an adult driver. However, the tuple Bob is redundant (i.e., equivalent), because Alice, being older than 18, is allowed to drive the car C even if she is alone in the car. Therefore, Bob is an answer to query adultDriver.

Methods for determining redundancy are less efficient than methods for determining satisfiability. As explained above, for conjunctive queries with built-in predicates, methods for determining redundancy are implemented with algorithms that run in exponential time. In contrast, methods for determining satisfiability can be implemented with algorithms that run in polynomial time.

FIG. 4 illustrates a method for determining the independence of a query answer from a database update for cases involving variable-interval queries and variable-interval database updates. The following theorem illustrates that the method of FIG. 4 completely decides the independence of a query answer from a database update in polynomial time:

Theorem 2

Let Q be a union of conjunctive variable-interval queries over the relations $E_1, \ldots, E_n$. Assume U is an update (either deletion or insertion) to the relation $E_1$, in which tuples satisfying the constraint C are added to $E_1$, where C is a constraint on the arguments of $E_1$ involving only built-in predicates, and each conjunct in C has one constant.

If Q is minimal, then method "detect-independence" will return "independent" if and only if Q is independent of U. The running time of an algorithm that implements method "detect-independence" is polynomial in the size of Q and C.

The proof of Theorem 2 will now be given. Levy 2 shows that Q is independent of deleting (E,C) if and only if it is independent of adding (E,C). Considering each conjunctive query $Q_i$ in Q in turn, if Q is independent of the deletion update (E,C), and $Q_i$ has a conjunct $E(\overline{Y})$ that is consistent with $C(\overline{Y})$, then the conjunct must be redundant. Therefore, the query is not minimal.

A range for a variable X in $Q_i$ is an interval (a,b), where a and b are either constants appearing in $Q_i$ or ∞, -∞. The interval can be either open or closed on either side. Two constants $a_1$ and $a_2$ are range-equivalent if, for every range R, $a_1 \in R$ if and only if $a_2 \in R$.

To show that $Q_i$ has a redundant subgoal, a set of representative databases must be considered. Each database D contains exactly one tuple for each subgoal of $Q_i$, and can be viewed as a mapping $\psi_D$ from the variables of $Q_i$ to a set of constants. Two databases $D_1$ and $D_2$ are equivalent if, for every variable X in $Q_i$, $\psi_{D_1}(X)$ is range-equivalent to $\psi_{D_2}(X)$. For each representative database D, it is sufficient to show that there is a derivation of the answer (i.e., the tuple $\psi_D(\overline{X})$, where $\overline{X}$ are the head variables of $Q_i$) that uses a proper subset of the facts in D.

There are two cases to consider. In the first case, the database D contains a tuple that may be deleted by the update. In this case, one simply removes the tuple. Since the query answer is independent of the update, there must be a derivation of the answer that uses a proper subset of D.

In the second case, the database D does not contain tuples that may be removed by the update. However, one can consider a subgoal of $Q_i$ that is consistent with $C(\overline{Y})$. Since the built-in atoms in $Q_i$ do not compare among variables, it is possible to modify D to a database D' such that one of the variables in $\overline{Y}$ is mapped to a new constant, and the resulting database D' contains a tuple that may be removed by the update. Furthermore, the mapping of the head variables of $Q_i$ in D' is the same as it is in D, and the mapping of D' is consistent with the built-in atoms in $Q_i$. The subset of tuples in D' must be sufficient to derive the answer to the query. Therefore, the corresponding subset of tuples in D is also sufficient to derive the answer to the query.

The methods described above determine the completeness of a query answer by examining only the query Q and the local-completeness information $\Gamma$. If the method determines that the query answer will be complete, then the query answer will be complete regardless of the specific database state, as long as it satisfies $\Gamma$. However, even if the method determines that the query answer will not be complete, there may still be specific database instances in which the query answer will be complete.

A method will now be described that determines whether the query answer will be complete for the current database state. The method is based on submitting two additional test queries to the database 400. The answers to the two test queries will determine whether the answer to query Q is guaranteed to be complete.

The method can be illustrated by considering the following query $Q_i$:

$$Q_1(\text{Title,Director}) \colon -\text{Movie(Title,Director,Year)\&Show(Title,Theater,Time)}. \quad (12)$$

The query $Q_1$ asks for the pairs (title,director) for movies currently playing in New York. It is assumed that the relation Show is known to be complete, that the relation Movie is known not to be complete, and that the functional dependency "Movie:Title→{Director,Year}" holds. In order to determine whether the query answer that is received for the current state of the database is complete, the completeness analyzer 510 submits the following two test queries to the database 400:

$$Q_2(\text{Title}) \colon -\text{Show(Title,Theater,Time); and} \quad (13)$$

$$Q_3(\text{Title}) \colon -\text{Movie(Title,Director,Year)}. \quad (14)$$

If the answer to query $Q_3$ is a superset of the answer to query $Q_2$, the answer to query $Q_1$ is complete. This is because the relation Movie, although not complete, contains all the movies currently playing in New York. Therefore, the relation Movie contains all the tuples that are needed to provide a complete answer.

More generally, the method is based on finding a subset of the subgoals of a query Q that provide a superset of the answer to the query Q. The method then determines whether the conjunctive query formed by the rest of the subgoals of the query Q is complete on that superset.

A given set of variables in a query may functionally determine the values of other variables. As an example, assume Q is a conjunctive query, and further assume that all equalities between variables have already been propagated in Q (i.e., Q does not imply additional equalities between variables or between a variable and a constant). Let $\overline{X}$ be a subset of the variables that appear in the body of Q. The variable Y in Q is functionally determined by $\overline{X}$ if: (1) $Y \in \overline{X}$; or (2) there exist variables $Y_1, \ldots, Y_l$ that are functionally determined by $\overline{X}$, an atom of the relation R in the body of Q exists in which the variables $Y_1, \ldots, Y_l$ and Y appear in the positions $i_1, \ldots, i_l$ and $i_{l-1}$, respectively, and the functional dependence $R:\{x_1, \ldots, x_l\} \to x_{l+1}$ holds.

In the query $Q_1$ defined by equation (12) above, the variables "Title," "Theater" and "Time" functionally determine all the other variables in the query $Q_1$. Assume that, for a given set of local-completeness statements $\Gamma$ and a database instance D, the following query Q is submitted:

$$Q(\overline{X}) \colon -p_1(\overline{X}_1)\& \ldots \&p_n(\overline{X}_n)\&C_q, \quad (15)$$

where $C_q$ is the conjunction of built-in atoms. $S_1$ denotes a maximal subset of $p_1(\overline{X}_1), \ldots, p_n(\overline{X}_n)$ such that: (1) the variables in $S_1$ functionally determine all the distinguished variables $\overline{X}$ of Q; and (2) the answer to the following query is complete witIL respect to $\Gamma$:

$$Q'(\overline{X'}) \colon -S_1 C_{S_1}, \quad (16)$$

where:

$\overline{X'}$ is the subset of $\overline{X}$ that appears in $S_1$; and $C_{S_1}$ is the projection of $C_q$ on the variables in $S_1$.

It should be noted that the projection of $C_q$ on $S_1$ may actually be a disjunction, in which case Q' is a union of conjunctive queries. If no subset $S_1$ exists, the completeness of the query answer for the current database state is unknown. Otherwise, the method defines $S_2$ as the set of non built-in atoms of Q that are not in $S_1$. The set $\overline{Y}$ is the set of variables that appear in both $S_1$ and $S_2$. $\overline{Y'}$ is a minimal subset of $\overline{Y}$ that functionally determines all the other variables in $\overline{Y}$. The method then defines the following two queries:

$$Q_2(\overline{Y'}) \colon -S_1 \& C_{S_1}; \text{ and} \quad (17)$$

$$Q_3(\overline{Y'}) \colon -S_2 \& C_{S_2}. \quad (18)$$

If the answer to $Q_3$ from D is a superset of the answer to $Q_2$ from D, the method determines that the answer to the query $Q_1$ is complete for the current database state. In other words, if the subset $S_1$ exists, the answer to Q' contains a superset of the projection of the complete answer to Q on the variables $\overline{X'}$. This follows because the answer to Q' is complete and contains less subgoals than Q. If the answer to $Q_3$ contains the answer to $Q_1$ over D, updates to incomplete parts of $S_2$ can generate tuples that can be used in a join of $S_1$ and $S_2$. Therefore, because the variables in $S_1$ functionally determine all the other variables in the body of Q, the answer to Q is guaranteed to be complete. Otherwise, the method determines that the answer-completeness for the current database state is unknown. Applying the method to the above example, the set $S_1$ includes the subgoal "Show (Title,Theater,Hour)," because Title determines Director and Year, and the relation Show is assumed to be complete. The set of variables $\overline{Y}$ include only Title, and the queries are therefore:

$$Q_2(\text{Title}): -\text{Show}(\text{Title},\text{Theater},\text{Time}); \text{ and} \qquad (19)$$

$$Q_3(\text{Title}): -\text{Movie}(\text{Title},\text{Director},\text{Year}). \qquad (20)$$

The method for determining the correctness of a query answer when the database contains partially incorrect information is analogous to the methods described above for determining the completeness of a query answer when the database is not complete. In the case of a database with partially incorrect information, the tuples of a relation $R'_i$ in the real database D are a superset of the tuples of $R_i$ in the virtual database D'. This is because some of the tuples in the real database are incorrect.

This is illustrated by letting C be a constraint on the arguments of the relation R. A database D satisfies the local-correctness statement "LCor(R', (R,C))" if R' contains all the tuples of R that satisfy C, i.e., if the result of the following two queries is identical over D:

$$Q_1(X_1, \ldots, X_n): -R(X_1, \ldots, X_n)\&C; \text{ and} \qquad (21)$$

$$Q_2(X_1, \ldots, X_n): -R'(X_1, \ldots, X_n)\&C. \qquad (22)$$

The method for determining the correctness of a query answer is analogous to the method described above for determining the completeness of a query answer. This is illustrated by defining $\Gamma_c$ as a set of local-correctness statements about the relations $\overline{R}=R_1, \ldots, R_n$, and their corresponding relations $\overline{R'}=R'_1, \ldots, R'_n$. Further, let Q be a query over the relations $\overline{R}$, and Q' be the result of replacing every occurrence of $R_i$ by $R'_i$ in Q, for i, $1 \leq i \leq n$. For any pair of database instances D and D' (for the relations $\overline{R}$ and $\overline{R'}$, respectively) in which D and D' satisfy $\Gamma_c$, the answer to query Q is correct with respect to $\Gamma_c$ if Q(D)=Q'(D').

As discussed above, the completeness of a query answer is determined by determining whether the query answer is independent of an insertion update to the database 400. Similarly, the correctness of a query answer is determined by determining whether the query answer is independent of a deletion update to the database 400. This is more formally stated by the following theorem:

Theorem 3

Let Q be a union of conjunctive queries, and let $\Gamma_c$ be a set of local-correctness statements of the form LCor RCor $(R'_i, (R_i, C_i))$ for i, $1 \leq i \leq n$. The answer to query Q is correct with respect to $\Gamma_c$ if and only if "In$^-$(Q, $(R_i, \neg C_i)$)" holds for every i, $1 \leq i \leq n$.

Accordingly, the methods described above for detecting the independence of a query answer from insertion or deletion updates to the database 400 are preferably used for deciding the correctness of a query answer.

Elkan discloses that if a query answer is independent of a deletion update to the database, it is also independent of an insertion update to the database, i.e.:

$$\text{In}^-(Q, (R, C))) \Rightarrow \text{In}^+(Q, (R, C))). \qquad (23)$$

Therefore, if a query answer will be correct, it will also be complete. Furthermore, for a database that is both incomplete and partially incorrect, if a query answer will be correct, then it will be both correct and complete.

Figure 5:
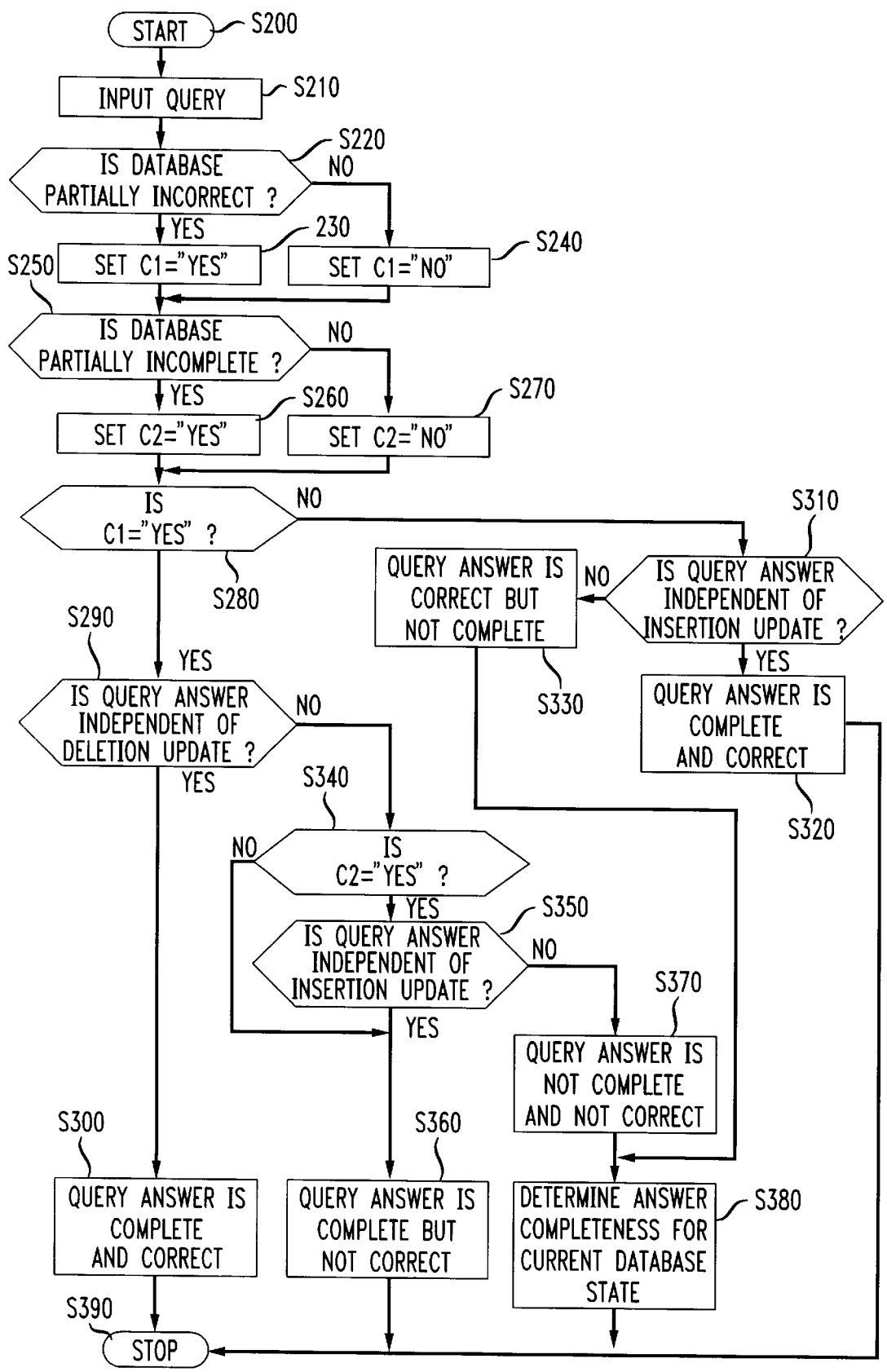
FIG. 5 is a flow chart of a preferred control routine for the completeness/correctness determiner of this invention.

FIG. 5 shows a preferred control routine for the completeness/correctness determiner 200 of this invention. The routine starts as step S200 and proceeds to step S210, where a query Q is input into the controller 500. Control then continues to step S220, where the correctness analyzer 520 determines if the database 400 is partially incorrect. Information on the correctness of the database 400 is supplied by either a user or by the database 400. If the database 400 is partially incorrect, control continues to step S230, where the control system sets the flag C1 to "yes". Otherwise, control jumps to step S240, where the control system sets the flag C1 to "no". From either step S230 or step S240, control then continues to step S250.

In step S250, the completeness analyzer 510 determines if the database 400 is partially incomplete. Information on the completeness of the database 400 is supplied by either a user or by the database 400. If the database is partially incomplete, control continues to step S260, where the control system sets the flag C2 to "yes". Otherwise, control jumps to step S270, where the control system sets the flag C2 to "no". From either step S260 or step S270, control then continues to step S280.

In step S280, the control system determines if the flag C1 is set to "yes". If the flag C1 is set to "yes", control continues to step S290. Otherwise, control jumps to step S310.

In step S290, the correctness analyzer 520 determines whether the answer to the query Q is independent of a deletion update to the database 400. If so, control continues to step S300. Otherwise, control jumps to step S340. In step S300, the control system determines that the answer to the query Q will be complete and correct. From step S300, control jumps to step S390, where the control routine stops.

In step S310, the completeness analyzer 510 determines if the answer to the query Q is independent of an insertion update to the database 400. If so, control continues to step S320. Otherwise, control jumps to step S330. In step S320, the completeness analyzer 510 determines that the answer to the query will be complete and correct. Control then jumps to step 390.

In step S330, the control system determines that the answer to the query Q will be correct, but will not be complete. From step S330, control jumps to step S380, where the completeness analyzer 510 determines if the answer to the query will be complete for the current state of the database 400 using the preferred control routine shown in FIG. 7. Control then continues to step S390.

In step S340, the control system determines if the flag C2 is set to "yes". If the flag C2 is set to "yes", control continues to step S350. Otherwise, control jumps to step S360. In step S350, the completeness analyzer 510 determines if the answer to the query Q is independent of an insertion update to the database 400. If so, control continues to step S360. Otherwise, control jumps to step S370. In step S360, the control system determines that the answer to the query Q will be complete, but will not be correct. From step S360, control jumps to step S390.

In step S370, the control system determines that the answer to the query Q will not be complete and will not be correct. Control then continues to step S380, where the completeness analyzer 510 determines if the answer to the query will be complete for the current state of the database 400 using the preferred control routine shown in FIG. 7. Control then continues to step S390.

The control routine preferably determines the independence of the answer to query Q from updates to the database at steps S290, S310 and S350 using the well known methods described above, and disclosed in Blakeley et al., Elkan and Levy 2. For cases involving variable-interval queries and variable-interval updates, the control system uses the preferred control routine shown in FIG. 6 to determine the independence of the query answer to a database update.

Figure 6:
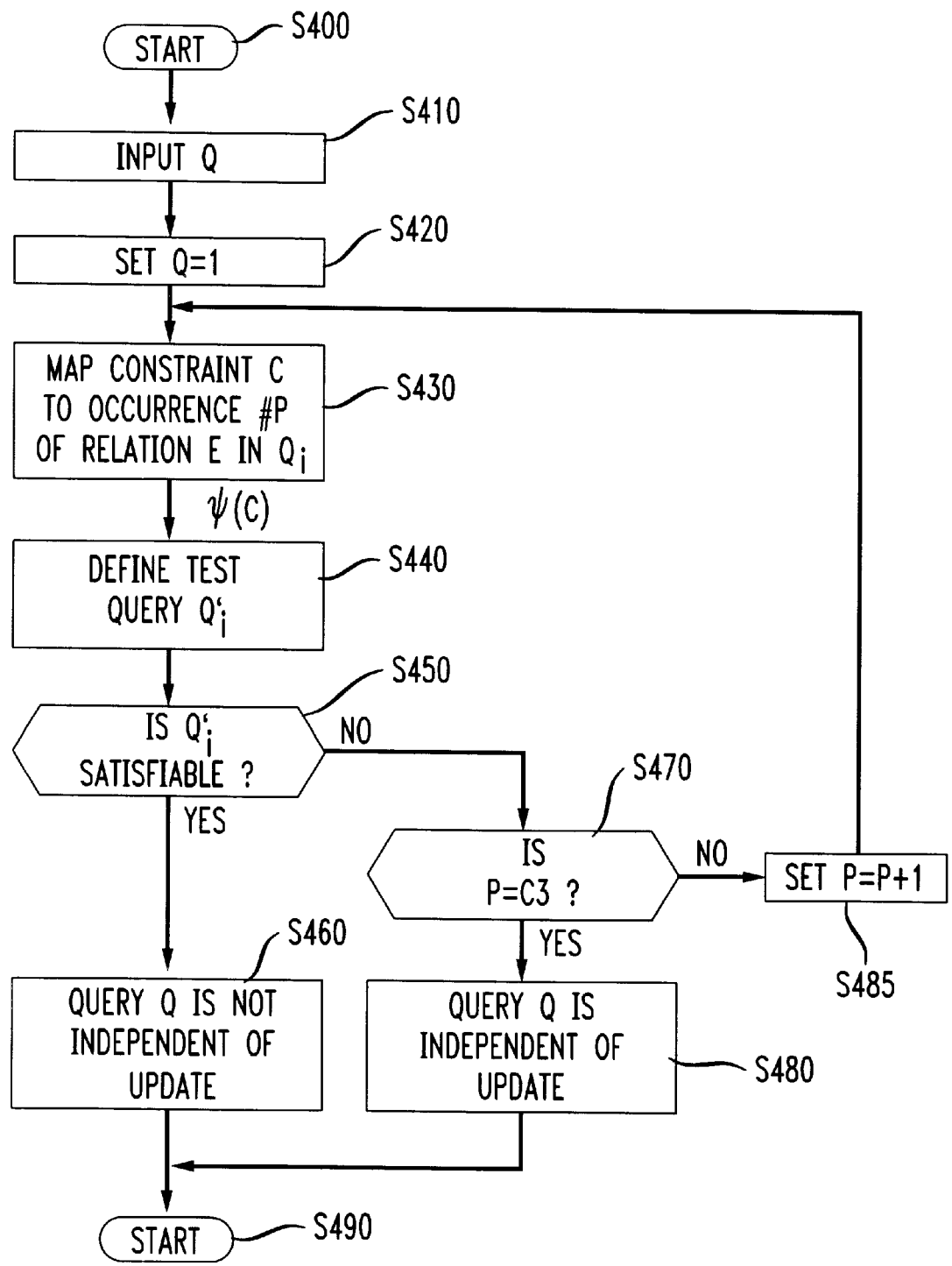
FIG. 6 is a flow chart of a preferred control routine for determining the independence of variable-integral query answers from variable-integral database updates.

The control routine of FIG. 6 starts at step S400 and proceeds to step S410. At step S410, a union of conjunctive queries Q ($Q_1 \cup \ldots \cup Q_n$) is input into the controller 500. Control then continues to step S420, where the control system sets a counter p to 1.

Next, in step S430, the control system maps the constraint C to the occurrence number p of the relation E in the conjunctive query $Q_i$, where: E is one of the relations mentioned in the query Q; $Q_i$ is one of the conjunctive queries that make up the query Q; and $C(X_1, \ldots, X_m)$ is a conjunctive constraint on the arguments of E that uses only built-in atoms, with each of the atoms having one constant. The resulting constraint map is represented by $\psi(C)$.

Next, in step S440, the control system defines a test query $Q'_j$ in which $\psi(C)$ is added to the subgoals of $Q_j$. Then, at step S450, the control system determines if $Q'_j$ is satisfiable. If the control system determines that $Q'_j$ is satisfiable, control continues to step S460. Otherwise, control jumps to step S470. In step S460, the control system determines that the answer to the query Q is not independent of the update to the database 400. From step S460, control jumps to step S490, where the control routine stops.

At step S470, the control system determines if the counter p is equal to the value C3, where C3 is the number of occurrences of the relation E in the conjunctive query $Q_i$. If the counter p is equal to C3, the control system determines that $Q'_j$ is not satisfiable for every occurrence of the relation in the conjunctive query $Q_i$, and control continues to step S480. In step S480, the control routine determines that the answer to the query Q is independent of an update to the database 400.

If, in step S470, the counter p is not equal to C3, the control routine determines that the satisfiability of $Q'_j$ has not been determined for every occurrence of the relation E in the conjunctive query $Q_i$, and control jumps to step S485. In step S485, the control system increments the counter p by 1. Control then returns to step S430.

Figure 7:
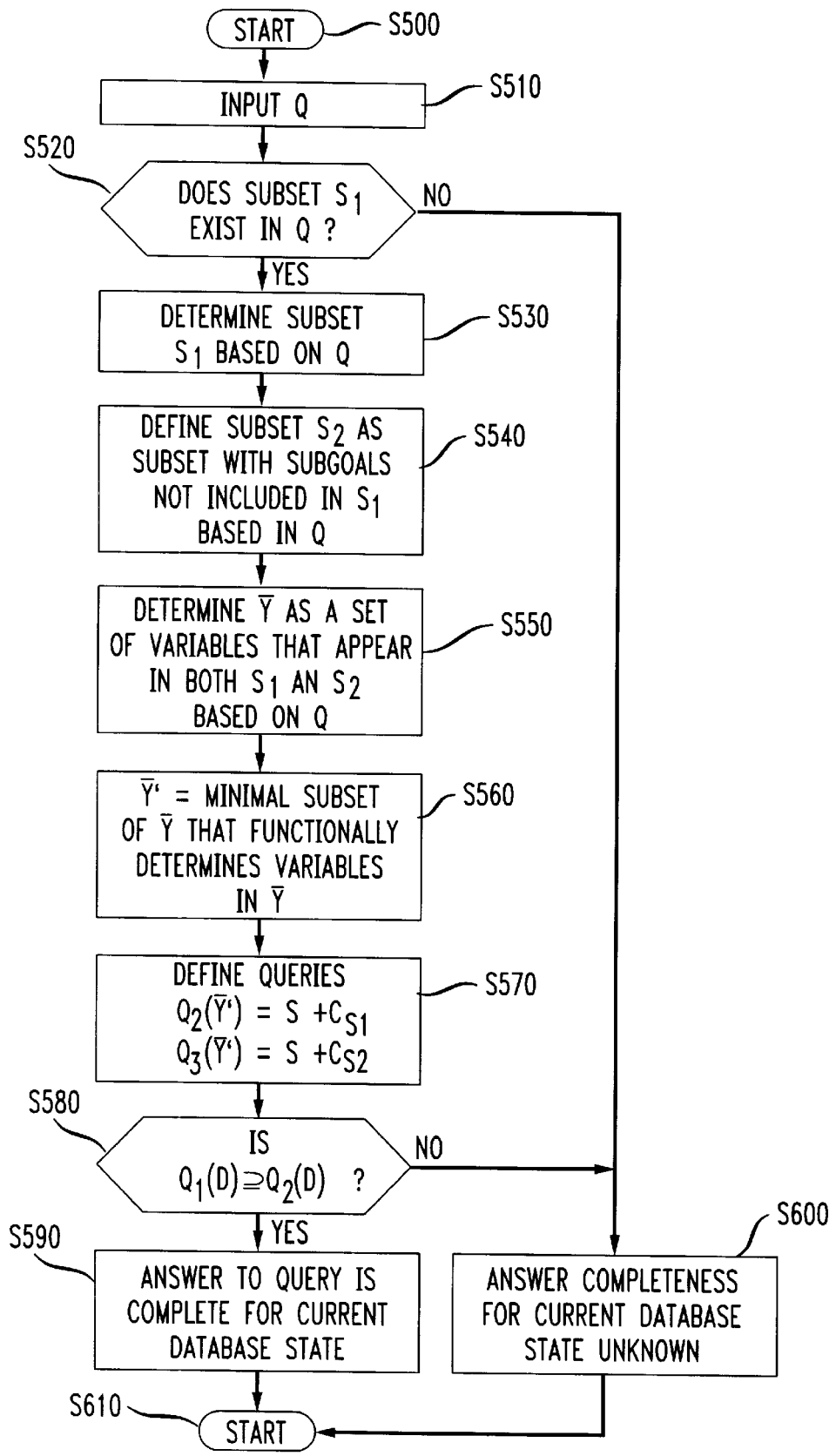
FIG. 7 is a flow chart of a preferred control routine for determining the completeness of a query answer for a current database state.

FIG. 7 shows in greater detail the preferred control routine for determining whether the answer to the query Q will be complete for the current state of the database 400 of step S380. The control routine of FIG. 7 is based on the method described in detail above.

The routine starts at step S500 and proceeds to step S510, where the query Q is input to the controller 500. Control then continues to step S520, where the control system determines if the subset $S_1$ of the query Q exists. If subset $S_1$ exists, control continues to step S530. Otherwise, control jumps to step S600, where the completeness analyzer 510 determines that the completeness of the answer to the query Q for the current database state is unknown. Control then continues to step S610, where the control routine stops.

In step S530, the control system determines the subset $S_1$ of the query Q. Next, in step S540, the control system defines a subset $S_2$ as a subset with subgoals that are not included in the subset $S_1$. Then, in step S550, the control system determines $\overline{Y}$ as a set of variables that appear in both subsets $S_1$ and $S_2$.

Next, in step S560, the control system defines $\overline{Y'}$ as the minimal subset of $\overline{Y}$ that functionally determines the variables in $\overline{Y}$. Control then continues to step S570, where the control system defines the queries $Q_2(\overline{Y'})$ and $Q_3(\overline{Y'})$. Control then continues to step S580.

In step S580, the control system determines if the answer to the query $Q_3$ from the database state D is a superset of the answer to the query $Q_2$ from the database state D. If $Q_3(D)$ is a superset of $Q_2(D)$, control continues to step S590, where the completeness analyzer 510 determines that the answer to the query Q is complete for the current database state D. Otherwise, the control jumps to step S600.

The completeness/correctness determiner 200 is preferably implemented on a programmed general purpose computer. However, it can also be implemented on a special purpose computer, a programmed microprocessor or microcontroller and peripheral integrated circuit elements, an ASIC or other integrated circuit, a hard wired electronic or logic circuit such as a discrete element circuit, a programmable logic device such as a FPGA, PLD, PLA or PAL, or the like. In general, any device on which a finite state machine capable of implementing the flow charts shown in FIGS. 5, 6 and 7 can be used to implement the completeness/correctness determiner 200 of this invention.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined in the following claims.

What is claimed is:

1. A method for determining whether a database that is partially correct will provide a correct answer to a query, comprising:

determining whether an answer to the query is independent of a deletion update to the database; and determining that the database will provide a correct answer to the query when the answer to the query is independent of a deletion update to the database.

2. The method of claim 1, wherein determining whether the database will provide a correct answer to the query comprises determining whether the database will provide a complete answer to the query.

3. The method of claim 1, wherein determining whether the answer to the query is independent of a deletion update to the database comprises determining whether tuples affected by the deletion update and the query are mutually unsatisfiable.

4. The method of claim 1, wherein the query has a conjunctive constraint that uses only built-in atoms, each of the built-in atoms having one constant, the step of determining whether the answer to the query is independent of a deletion update to the data comprising, for every occurrence of the relation in a conjuct of the query, the steps of:

mapping the constraint to the occurrence;

adding the mapping of the constraint to the query to form a test query;

determining whether the test query is satisfiable; and determining that the answer to the query is independent of a deletion update to the database when no satisfiable test query is found.

5. A method for determining whether a database that is partially complete will provide a complete answer to a query, comprising:

determining whether an answer to the query is independent of an insertion update to the database; and determining that the database will provide a complete answer to the query when the answer to the query is independent of an insertion update to the database.

6. The method of claim 5, wherein determining whether the answer to the query is independent of an insertion update to the database comprises determining whether tuples affected by the insertion update and the query are mutually unsatisfiable.

7. The method of claim 5, wherein the query has a conjunctive constraint that uses only built-in atoms, each of the built-in atoms having one constant, the step of determining whether the answer to the query is independent of an insertion update to the database comprising, for every occurrence of the relation in a conjunct of the query, the steps of:

mapping the constraint to the occurrence;

forming a test query by adding the mapping of the constraint to the query;

determining whether the test query is satisfiable; and determining that the answer to the query is independent of an insertion update to the database when no satisfiable test query is found.

8. An information retrieval system for retrieving information from a relational database, comprising:

a device that sends a first query to the database; and a completeness/correctness determiner that receives the first query from the device and that determines if an answer to the first query from the database will be complete and correct, the completeness/correctness determiner comprising:

a completeness analyzer that determines whether the answer to the first query is independent of an insertion update to the database;

a correctness analyzer that determines if the answer to the first query is independent of a deletion update to the database; and a controller that communicates with and controls operations of the completeness analyzer and the correctness analyzer.

9. A method for determining whether a database whose current state is partially complete will provide a complete answer to a query, comprising:

determining a first subset of subgoals of the query, the subgoals of the first subset having a first set of variables that functionally determine distinguished variables of the query, where an answer to the subgoals of the first subset is complete for the current database state;

determining a minimal subset of a second set of variables that appear both in the first subset of subgoals and a second subset of subgoals that are not included the first subset, the variables in the minimal subset functionally determining all of the other variables in the second set of variables;

determining whether an answer to the second subset of subgoals for the minimal subset of variables is a superset of the answer to the first subset of subgoals for the minimal subset of variables; and determining that the database will provide a complete answer to the query if the answer to the second subset of subgoals is a superset of the answer to the first subset of subgoals.

* * * * *